May 2, 1939.   R. T. KILLMAN ET AL   2,156,814
METHOD OF PROJECTING MOTION PICTURES IN NATURAL COLOR
Filed Dec. 21, 1936   2 Sheets-Sheet 2

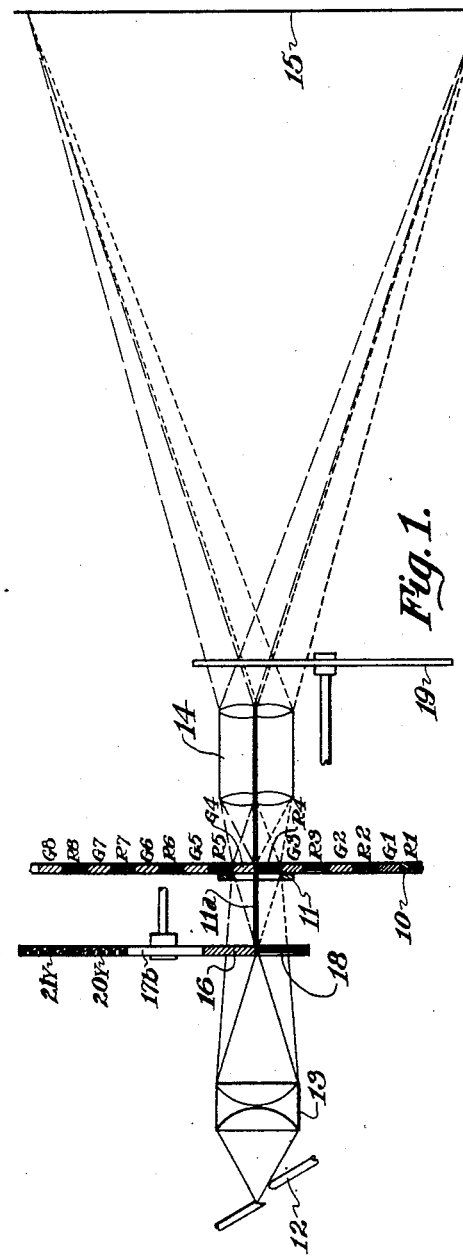

Robert T. Killman
Thomas A. Killman
INVENTOR.

BY Robert T. Killman
ATTORNEYS.

Patented May 2, 1939

2,156,814

UNITED STATES PATENT OFFICE 2,156,814

METHOD OF PROJECTING MOTION PICTURES IN NATURAL COLOR

Robert T. Killman and Thomas A. Killman, Nashville, Tenn.

Application December 21, 1936, Serial No. 116,899

4 Claims. (Cl. 88—16.4)

This invention relates to a method of exhibiting motion pictures in natural colors from a film such as is described in our United States Patents No. 2,060,503 and No. 2,060,505, issued November 10, 1936, and in our co-pending application Serial No. 110,962 filed November 16, 1936, i. e., a film bearing a series of pairs of color-separation images, the two images of each pair being made simultaneously, from the same viewpoint, through filters of complementary color value, or by similar means.

A method of projecting such a film is disclosed in our United States Patent No. 2,060,503 and it is the purpose of the present invention to make certain improvements upon and additions to the methods and apparatus disclosed in that patent.

Experiment has shown that, while the results obtained by the use of the methods and apparatus disclosed in our United States Patent No. 2,060,503 are in general very satisfactory, these results are in a majority of cases capable of considerable improvement.

For instance, it was specified in the above mentioned patent that the filter disc was divided along a diameter, one half bearing two semi-annular color filter areas of substantially complementary color, the other half being uniformly darkened and without color value. From the film, two images constituting a pair were projected upon the screen in superposition, each one of the images being projected through the one of the semi-annular color filter areas corresponding in color to the color of light of which that image is a photographic record, and then, the film having been advanced one frame, and the filter disc turned through one half turn, two images not constituting a pair, one of said images being one of the pair originally projected and the other image being one of the images of the next succeeding pair, are projected to the screen in superposition through the uniformly darkened portion of the filter disc. This method will produce satisfactory results only when the two complementary colored sections of the filter disc are not only adjusted to each other so that their light beams superposed upon the screen (film omitted) produce a satisfactory white light, but also are adjusted relative to each other and to the uniformly darkened portion of the filter disc, so that the total visible spectrum transmission of each of the three areas is equal to that of each of the others.

If this condition is not fulfilled the screen image has a tendency to flicker. The image may flicker as a whole, appearing the same as shutter blade flicker, or the flicker may be confined to the colored objects in the picture and increase with the strength of the color. This last mentioned flicker of colored objects only takes place where the sum of the two light beams passing through the two complementary color areas of the filter wheel to the screen in superposition is equal in amount of visible light to the sum of the two beams passing through the uniformly darkened portion of the filter to the screen in superposition, but neither of the beams passing through the colored areas (taken singly) is equal to the proper single beam passing through the darkened portion of the filter disc.

We have found that, in order to eliminate both color fringe and flicker, it is necessary to project the two images which constitute a pair through substantially complementary filters, and then to project one of the images of that pair, by means of light having the same intensity as the colored light by which it was first projected, together with one image of the next succeeding pair, by light of the same intensity as the colored light by which it will be next projected, and the light by which the two un-paired images are projected must be of the same color for both images.

In our Patent No. 2,060,503 we specified white light of reduced intensity for projecting the un-paired images, but we have since discovered that as long as the light is of the same color for both of the un-paired images, the color fringe is substantially eliminated. We have found the results to be most satisfactory if the fainter and weaker colors, such as pink, faint shades of blue, orange, purple, or green, etc., and notably yellow, are used to project the un-paired images. The use of yellow, in particular, seems to add a sunlit quality or glow to the resulting screen image.

Accordingly it is an object of our invention to provide a method of projecting motion pictures in natural colors, eliminating the color fringing and color flicker to which devices of this type have heretofore been subject.

Another object of this invention is to provide a method of exhibiting motion pictures faithfully in the natural colors of the object photographed, the method requiring only slight additions or attachments of the standard machines and apparatus now in use.

The mechanism and the method by which we accomplish these and other objects which will appear later is best understood by reference to the following description and the accompanying drawings in which Figure 1 is a diagrammatic representation of a projector incorporating our invention showing the projection of two paired images, and Figure 2 is a similar diagrammatic representation showing the projection of two un-paired images.

Figure 3:
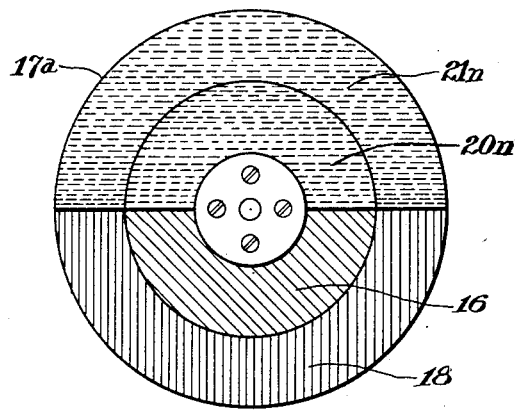
Figure 3 is a plan view showing the one of the alternative arrangements of the filter disc of our invention which makes use of neutral density filter areas for projecting the unpaired images.

Referring now in more detail to the drawings the numeral 10 denotes a positive film bearing a series of pairs of color-separation images, R1 being an image photographed by red light and G1 being an image photographed simultaneously and from the same viewpoint as R1 but by green light. We have used the terms red and green simply as denoting the two complementary colors of light by which it is usual to make color-separation images of this type and do not wish to be restricted to any specific color or hue in this connection.

Similarly R2 and G2 constitute a pair of images and so on throughout the length of the film. This film may be made by the apparatus and methods disclosed in our United States Patent No. 2,060,505, issued Nov. 10, 1936, our co-pending application Serial No. 110,962 filed November 16, 1936, or by other suitable means.

In Figure 1 two paired images R4 and G4 are shown framed by the double aperture plate 11 and projected by light from a suitable source 12, and condensing system 13 through the double projecting lens 14 to a screen 15 in superposition. The double lens system 14 may be constructed as disclosed in our co-pending application Serial No. 107,324 filed Oct. 24, 1936, or in any other suitable manner. For purposes of illustration we have here shown the projecting lens system 14 as composed of two ordinary projection lenses placed one above the other with their optical axes substantially parallel. The distance between their optical axes is made substantially equal to the spacing of the images upon the film 10. In order to do this it is usually necessary to remove a portion of each lens by grinding or otherwise, the cut being made on the underside of the upper lens and on the upper side of the lower lens parallel to their optical axes. The two lenses may be divided by a thin plate or septum to prevent light from intermingling within the two lenses. The upper lens projects the image occupying the upper aperture and the lower lens projects the image occupying the lower aperture. Suitable adjustable mounting means may be provided, if desired, for changing the direction of the optical axis of one or both lenses in order that the screen image projected by one lens may be caused to fall exactly upon the screen image projected by the other lens.

The image G4 is projected by means of light passing through the green colored area 16 of the filter disc 17b while the image R4 is projected by light passing through the red area 18 of the filter disc 17b. The two colored beams are prevented from intermingling before striking the film 10 by means of the reflecting septum 11a as disclosed in our co-pending application Serial No. 79,040 filed May 11, 1936. The two images R4 and G4, thus projected, by means of light of substantially the same color as that by which they were photographed, upon the screen 15 in superposition, merge and form thereon an image of the subject photographed, in its natural colors. Since images R4 and G4 were made simultaneously, and from the same viewpoint all color fringing due to parallax and to difference in motion phase is eliminated in this composite image.

After this composite image has remained upon the screen for its allotted time the usual shutter 19 intercepts the two light beams, a suitable intermittent mechanism (not shown) advances the film one frame so that images G4 and R5 occupy the aperture and the filter disc 17b revolves so that areas 20y and 21y intercept the light beams falling upon the film. This phase of operation is shown by Figure 2.

The two images G4 and R5, which now occupy the aperture were not made simultaneously and therefore show different motion phases of moving objects. They cannot, therefore, be superposed in perfect register upon the screen and if projected thereon by means of complementary colored light beams as the two paired images R4 and G4 were previously projected, there would be formed, around the moving objects in the picture the fringes of the two complementary colors caused by the lack of registration of the images of the moving objects. One method of eliminating this color fringe (without changing the operation of the standard intermittent movement of a one-frame pull down occurring twenty-four times per second) would be to cut off the light beams during the interval that un-paired images occupy the aperture, and only project the paired images. This method would lead to very objectionable flicker since the screen would be darkened and illuminated at a rate of twelve times per second.

In order to eliminate the color fringe and at the same time prevent the introduction of flicker we have in our United States Patent No. 2,060,503 and in the present application made use of the basic principle of the flicker photometer. Briefly stated, this principle is as follows:

If two lights of different color and different brightness or intensity are presented to the eye alternately in rapid succession and if the frequency of alternation be gradually increased, color differences will cease to be perceptible at a lower frequency of alternation than that at which differences in brightness cease to be perceptible. We make use of this principle by projecting to the screen by means of light of some one color, the two unpaired images. Since both images are projected by light of the same color there can be formed no color fringe, since color fringe can only be produced by lack of registration of two colors.

In our Patent No. 2,060,503 the overall or average brightness of the composite picture projected from the un-paired images was made equal to the brightness of the composite picture projected through the complementary colored filters from the paired images but no attempt was made to match the brightness of each individual image when it was projected with its paired image and when it was projected with an image from another pair. This lack of individual image brightness matching led, as explained above, to selective flicker of the colored portions of the image. One purpose and object of the present invention is to provide means for eliminating this selective color flicker. This we perform by adjusting the density of the areas of the filter through which the un-paired images are projected so that each time an image is projected by light from the complementary colored areas of the filter or from the third colored areas, it is always projected by light of the same intensity. For instance, in the rotary disc filter 17b shown in Figures 1, 2 and 4 the total transmission of light over the visible spectrum of the yellow area 21y is so adjusted, either by making the yellow pigment denser, by adding black or opaque pigment, or other equivalent means, as to be substantially identical with the total transmission of light in the visible portion of the spectrum of the green area 16.

Also the transmission of the yellow area 20y is matched to that of the red area 18. The yellow areas 20y and 21y are of the same color, i. e., they have the same spectral characteristics, but do not have the same density or total transmission of the visible spectrum. Also the areas 16 and 18 are of substantially complementary color but do not have the same density or total transmission of the visible spectrum.

In our Patent No. 2,060,503 we specified white light of reduced intensity for projecting the un-paired images. We have since found that, as long as the un-paired images are projected by light of the same color and the intensities of the light beams are matched to the complementary colored light beams as above described, a great variety of colors may be used as well as white light for projecting the unpaired images, as far as color fringe and flicker is concerned. However, since the introduction of the third color tends to weaken or dilute the color of the composite picture to some extent, we have found that the selection of some color, in which the picture is deficient, results in a more pleasing and satisfactory picture.

Figure 4:
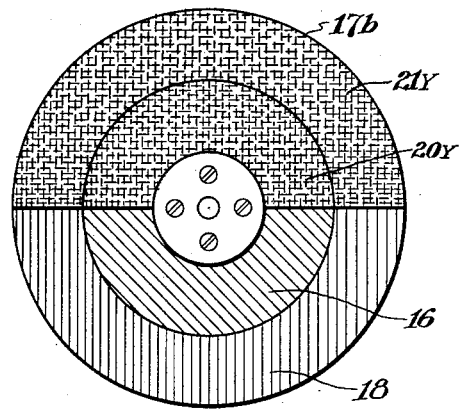
Figure 4 is a plan view showing another alternative arrangement of the filter disc in which yellow filter areas are used for projecting the un-paired images.
Figure 5:
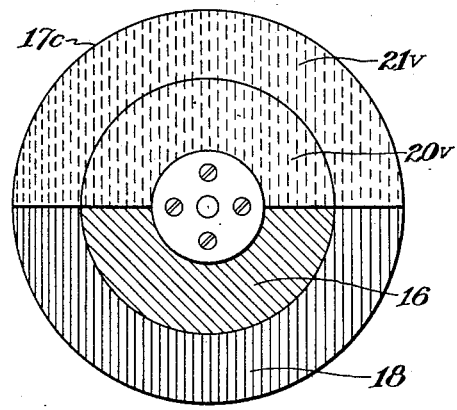
Figure 5 is a plan view of a third alternative arrangement of the filter disc making use of violet or purple filter areas for projecting the un-paired images.

We have shown in Figures 3, 4 and 5 three alternative arrangements of the rotary filter disc. In Figure 3 areas 16 and 18 are complementary green and red filters respectively, so adjusted with respect to each other as to produce (with the type of illumination employed, etc.) a satisfactorily white screen. The areas 20n and 21n are neutral density areas, the density of area 21n being such that its total transmission of the visible portion of the spectrum is the same as that of the green area 16 and the density of the neutral area 20n being similarly matched with the red area 18.

In Figure 4 the areas 20y and 21y are of yellow color and match in density the red and green areas 18 and 16 respectively.

In Figure 5 the areas 20v and 21v are of a violet color and match in density the red and green areas 18 and 16 respectively.

While we have shown the filter as interposed between the light source and the film, it is of course obvious that it may be placed elsewhere, as for instance, between film and projection lens or between projection lens and screen without departing from the spirit of this invention.

Figure 6:
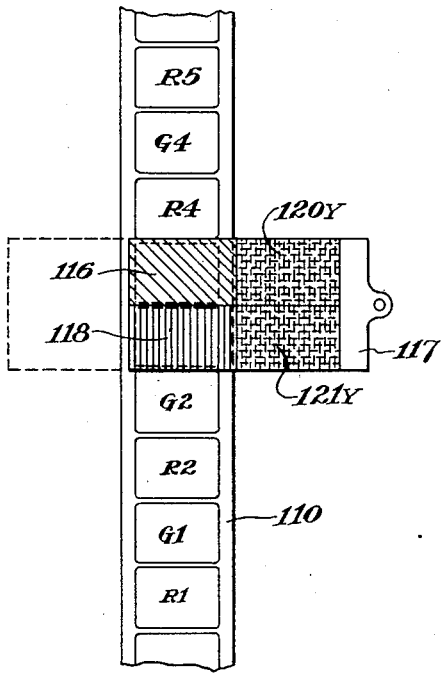
Figure 6 is an optional arrangement of the device showing a reciprocatory, rectangular filter which may be used instead of the rotating filter disc.

We also show, in Figure 6, an alternative arrangement of the filter. In this arrangement the filter takes the form of a rectangular transparent plate 117, divided by horizontal and vertical medial lines into four similar rectangles. The small rectangle 116 is colored green, rectangle 118 is colored a complementary red, while rectangles 120y and 121y are of the same color, in this particular figure, yellow, but may be given other colors as explained above for the disc filter. The yellow area 121y matches in density the green area 116 and the yellow area 120y matches in density the red area 118. The filter is arranged to reciprocate horizontally in consonance with the movements of the film 110, by some suitable means. Optically the results are the same as secured by the use of the rotating disc filter.

Various modifications of the forms herein disclosed in detail will be apparent to those skilled in the art and it should not be understood that we are limited to these illustrative forms, except as indicated in the following claims.

We claim as our invention:

1. A method of exhibiting motion pictures in natural colors comprising simultaneously projecting, from a film bearing a succession of pairs of color separation images, two images constituting a pair upon a screen in superposition, each image being projected by light of substantially the same color as that by which it was photographed, and then projecting one image of that pair together with one image of another pair by means of light of a selected third color.

2. A method of exhibiting motion pictures in natural colors comprising simultaneously projecting, from a film bearing a succession of pairs of color separation images, two images constituting a pair upon a screen in superposition, each image being projected by light of substantially the same color as that by which it was photographed, and then projecting one image of that pair together with one image of another pair by means of light of a selected third color, the brightness of the light of the third color by which each un-paired image is projected being the same as the brightness of the complementary colored light by which said image is projected with its paired image.

3. A method of exhibiting motion pictures in natural colors comprising simultaneously projecting, from a film bearing a succession of pairs of color separation images, two images constituting a pair upon a screen in superposition, each image being projected by light of substantially the same color as that by which it was photographed, and then projecting one image of that pair together with one image of another pair by means of light having substantially the same color value for each image, the light by which the first mentioned of the two un-paired images is projected being of the same brightness as the colored light by which it was first projected with its paired image, and the light by which the second of the two un-paired images is projected being of the same brightness as the colored light by which it will be next projected with its paired image.

4. A method of exhibiting motion pictures in natural colors comprising providing a succession of groups of color separation images of a subject, each image of a group being made simultaneously from the same viewpoint with other images of the group by means of light of appropriate color, and simultaneously projecting the images of one group upon a screen in superposition by means of light of like color to that by which they were photographed, and then projecting images from different groups upon the screen in superposition by means of light of one color, the intensity or brightness of said light being for each image substantially equal in intensity or brightness to the colored light by which that image is projected with others of its group.

ROBERT T. KILLMAN.
THOMAS A. KILLMAN.